(12) United States Patent
Zhou et al.

(10) Patent No.: US 11,553,224 B1
(45) Date of Patent: Jan. 10, 2023

(54) METHOD AND DEVICE FOR ADJUSTING BIT RATE DURING LIVE STREAMING

(71) Applicant: BEIJING DAJIA INTERNET INFORMATION TECHNOLOGY CO., LTD., Beijing (CN)

(72) Inventors: Chao Zhou, Beijing (CN); Liang Guo, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/857,675

(22) Filed: Jul. 5, 2022

(30) Foreign Application Priority Data

Jul. 6, 2021 (CN) .......................... 202110759559.2

(51) Int. Cl.
*H04N 7/173* (2011.01)
*H04N 21/238* (2011.01)
*H04N 21/24* (2011.01)
*H04N 21/2187* (2011.01)

(52) U.S. Cl.
CPC ....... *H04N 21/238* (2013.01); *H04N 21/2187* (2013.01); *H04N 21/2402* (2013.01)

(58) Field of Classification Search
CPC ............. H04N 21/238; H04N 21/2187; H04N 21/2402
See application file for complete search history.

(56) References Cited

U.S. PATENT DOCUMENTS

| 2016/0301960 | A1* | 10/2016 | Sze ................... H04N 21/6373 |
| 2018/0220170 | A1* | 8/2018 | Yu ..................... H04N 21/23106 |
| 2019/0320211 | A1 | 10/2019 | Chen |
| 2022/0124387 | A1* | 4/2022 | Zhou ............. H04N 21/234354 |

FOREIGN PATENT DOCUMENTS

| CN | 105871808 A | 8/2016 |
| CN | 106454412 A | 2/2017 |
| CN | 107295395 A | 10/2017 |
| CN | 110996117 A | 4/2020 |
| CN | 111107395 A | 5/2020 |
| CN | 112751865 A | 5/2021 |
| WO | WO2015131934 A1 | 9/2015 |

OTHER PUBLICATIONS

Chinese Office Action for Chinese Application No. 202110759559.2 dated Aug. 23, 2021 (14 pages).
Notification to Grant Patent Right for Invention for Chinese Application No. 202110759559.2 dated Sep. 11, 2021 (9 pages).

* cited by examiner

*Primary Examiner* — Gigi L Dubasky
(74) *Attorney, Agent, or Firm* — Reising Ethington, P.C.

(57) ABSTRACT

The present disclosure relates to a method and device for adjusting a bit rate during live streaming. In the method for adjusting the bit rate during live streaming includes: a parameter of a network used by an anchor terminal for transmitting live streaming data is acquired, an adjustment range of the bit rate for uploading the live streaming data is determined based on the parameter of the network used by the anchor terminal for transmitting the live streaming data, and the bit rate for uploading the live streaming data by the anchor terminal is adjusted based on a determined adjustment range.

17 Claims, 2 Drawing Sheets

METHOD AND DEVICE FOR ADJUSTING BIT RATE DURING LIVE STREAMING

CROSS-REFERENCE TO RELATED APPLICATIONS

This application claims priority to Patent application No. 202110759559.2, filed on Jul. 6, 2021 in the China National Intellectual Property Administration, the disclosure of which is herein incorporated by reference in its entirety.

TECHNICAL FIELD

The present disclosure relates to the field of video technology, and in particular, to a method and device for adjusting a bit rate during live streaming.

BACKGROUND

In order to adapt to a fluctuating network environment, a bit rate self-adapting technology is widely used in a live streaming service. At an anchor side, a bit rate for uploading data by an anchor terminal is dynamically adjusted according to an uplink network status of the anchor terminal to ensure a smoothness of pushing live streaming data. A live stream is converted into a plurality of grades with different bit rates/resolutions at a server through transcoding, and then according to a downlink network status of a user terminal, different transcoding grades are selected self-adaptively for the user terminal in real time to ensure the clarity and smoothness of viewing.

SUMMARY

Exemplary embodiments of the present disclosure are to provide a method and device for adjusting a bit rate during live streaming, so as to solve at least the problem in pushing live streaming data in the related art, which may not solve any of the above problems.

A first aspect of embodiments of the present disclosure provides a method for adjusting a bit rate during live streaming, including: acquiring a parameter of a network used by an anchor terminal for transmitting live streaming data, wherein the parameter of the network for transmitting the live streaming data is configured to evaluate a quality of the network for transmitting the live streaming data; determining an adjustment range of the bit rate for uploading the live streaming data based on the parameter of the network used by the anchor terminal for transmitting the live streaming data; and adjusting the bit rate for uploading the live streaming data by the anchor terminal based on a determined adjustment range.

A second aspect of embodiments of the present disclosure provides a device for adjusting a bit rate during live streaming, including: a network parameter acquiring unit, configured to acquire a parameter of a network used by an anchor terminal for transmitting live streaming data, wherein the parameter of the network for transmitting the live streaming data is configured to evaluate a quality of the network for transmitting the live streaming data; an adjustment range determining unit, configured to determine an adjustment range of the bit rate for uploading the live streaming data based on the parameter of the network used by the anchor terminal for transmitting the live streaming data; and a bit rate adjusting unit, configured to adjust the bit rate for uploading the live streaming data by the anchor terminal based on a determined adjustment range.

A third aspect of embodiments of the present disclosure provides an electronic device/server, including: a processor; and a memory, storing an instruction executable by the processor, and the processor is configured to execute the instruction to implement the method for adjusting a bit rate during live streaming according to the above first aspect.

A fourth aspect of embodiments of the present disclosure provides a non-transitory computer readable storage medium having a computer program stored thereon that, when being executed by a processor of an electronic device, causes the electronic device to perform the method for adjusting a bit rate during live streaming according to the above first aspect.

A fifth aspect of embodiments of the present disclosure provides a computer program product including a computer program/instruction, when the computer program/instruction is executed by the processor, the method for adjusting a bit rate during live streaming according to the above first aspect.

It is to be understood that both the foregoing general description and the following detailed description are exemplary and explanatory only and are not intended to limit the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principle of the present disclosure and do not intend to limit the present disclosure.

DETAILED DESCRIPTION

In order to make a person skilled in the art well understand the technical solution of the present disclosure, the technical solution in embodiments of the present disclosure will be clearly and completely described below with reference to the accompanying drawings.

It should be noted that terms such as "first" and "second" in the description and claims of the present disclosure and the above-mentioned drawings are used to distinguish similar objects from each other, and are not intended to describe a specific order or sequence. It may be understood that such terms are interchangeable under appropriate circumstances so that an embodiment of the present disclosure described herein may be practiced in sequences other than those illustrated or described herein. The implementations described in the illustrative examples below are not intended to represent all implementations consistent with the present disclosure. Rather, they are merely examples of devices and methods consistent with some aspects of the present disclosure as recited in the appended claims.

It should be noted here that expressions such as "at least one of several items" in the present disclosure each means including all of the three parallel situations "any one of the several items", "a combination of any of the several items", and "all of the several items". For example, "including at least one of A and B" includes the following three parallel situations: (1) including A; (2) including B; and (3) including A and B. Another example is "executing at least one of step 1 and step 2", which means the following three parallel situations: (1) executing step 1; (2) executing step 2; and (3) executing step 1 and step 2.

In order to solve the problem of bit rate range conflict between a self-adaption of pushing live streaming data and that of pulling live streaming data in the related art, the present disclosure provides a strategy of using a plurality of grades during pushing live streaming data, so as to avoid a problem that when renin is relatively large, pushing live streaming data will be difficult to adapt to the anchor terminal with poor network quality, and when $r_{min}$ is relatively small, the transcoding grade will be relatively small, and thus the clarity of viewing will be poor.

Hereinafter, a method and device for adjusting a bit rate during live streaming according to an exemplary embodiment of the present disclosure will be described in detail with reference to FIG. 1 to FIG. 4.

Figure 1:
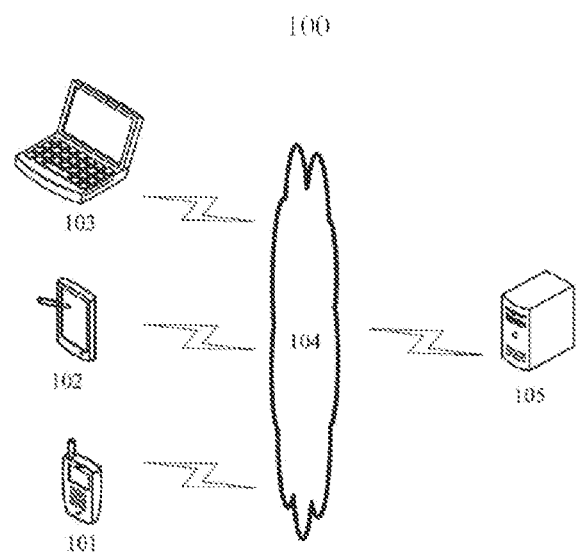
FIG. 1 illustrates an exemplary system architecture 100 to which an exemplary embodiment of the present disclosure may be applied.

FIG. 1 illustrates an exemplary system architecture 100 to which exemplary embodiments of the present disclosure may be applied.

As shown in FIG. 1, the system architecture 100 may include terminal devices 101, 102, and 103, a network 104 and a server 105. The network 104 is a medium providing a communication link between the terminal devices 101, 102, 103 and the server 105. The network 104 may include various connection types, such as wired communication link, wireless communication link, fiber optic cable or the like. A user can use the terminal devices 101, 102, and 103 to interact with the server 105 through the network 104 to receive or send messages (e.g., video-data uploading request, video-data downloading request) and the like. Various communication client applications, such as audio and video calling software, audio and video recording software, instant communication software, conference software, email client, social platform software, and the like, may be installed on the terminal devices 101, 102 and 103. The terminal devices 101, 102, and 103 may be hardware or software. When the terminal devices 101, 102, and 103 are hardware, they may be various electronic devices with a display screen and capable of audio and video playing, recording, editing, and the like, including but not limited to smart phones, tablet computers, laptop computers and desktop computers, and the like. When the terminal devices 101, 102, and 103 are software, they may be installed in the electronic devices listed above, which may be implemented as a plurality of software or software modules (for example, used to provide distributed services), or as a single software or software module. The form of the terminal devices 101, 102, and 103 is not specifically limited herein.

The terminal devices 101, 102, and 103 may be installed with image-capturing devices (e.g., cameras) to capture video data. In practice, the smallest visual unit composing a video is a frame. Each frame is a static image. A dynamic video is formed by synthesizing a sequence of temporally consecutive frames together. In addition, the terminal devices 101, 102, 103 may also be installed with components for converting electrical signals into sounds (such as speaker) to play sounds, and may also be installed with devices for converting analog audio signals into digital audio signals (for example, microphone) to capture sound.

The server 105 may be a server that provides various services, such as a background server that provides support for multimedia applications installed on the terminal devices 101, 102, and 103. The background server may parse and store received audio and video data uploading requests and other data, and may also receive audio and video data downloading requests sent by the terminal devices 101, 102, and 103, and feed back audio and video data indicated by the audio and video data downloading requests to the terminal devices 101, 102 and 103.

It should be noted that the server may be hardware or software. When the server is hardware, it may be implemented as a distributed server cluster composed of a plurality of servers, or may be implemented as a single server. When the server is software, it may be implemented as a plurality of software or software modules (for example, used to provide distributed services), or may be implemented as a single software or software module. The form of the server is not specifically limited herein.

It should be noted that the audio processing method provided by the embodiments of the present disclosure is usually executed by a terminal device, but may also be executed by a server, or may also be executed by the terminal device and the server in cooperation. Accordingly, the audio processing device may be provided in the terminal device, in the server, or in both the terminal device and the server.

It should be understood that the numbers of terminal devices, networks and servers in FIG. 1 are merely illustrative. According to implementation requirements, there may be any number of terminal devices, networks and servers, which are not limited in the present disclosure.

In the related art, a range of a bit rate for uploading data is usually limited at an anchor side. For example, the bit rate for uploading video data is between $[r_{min}, r_{max}]$, and a current optimal encoding bit rate $r^{opt} \epsilon [r_{min}, r_{max}]$ is dynamically adjusted according to a real-time network status. At the server side, the live stream received is converted into a plurality of predefined grades $\{r_1, r_2, r_3, \ldots, r_n\}$, which is a set of bit rates and satisfies $r_1 < r_2 < r_3 \leq \ldots < r_n$. The user terminal may dynamically select an optimal grade according to the current real-time network status thereof to ensure the clarity and smoothness of viewing.

In order to ensure sufficient adaptability, the range of $[r_{min}, r_{max}]$ is relatively large, so as to adapt to different network environments. Similarly, the span of $\{r_1, r_2, r_3, \ldots, r_n\}$ is also required to be relatively large, so as to meet different requirements for clarity and smoothness. When transcoding is performed, it is not expected to transcode a low bit rate into a high bit rate, that is, $r_n \leq r_{min}$ is required. Therefore, there is a contradiction, i.e., if $r_{min}$ is relatively large, pushing live streaming data will be difficult to adapt to the anchor terminal with poor network quality, and if $r_{min}$ is relatively small, the transcoding grade will be relatively small, and thus the clarity of viewing will be poor.

Figure 2:
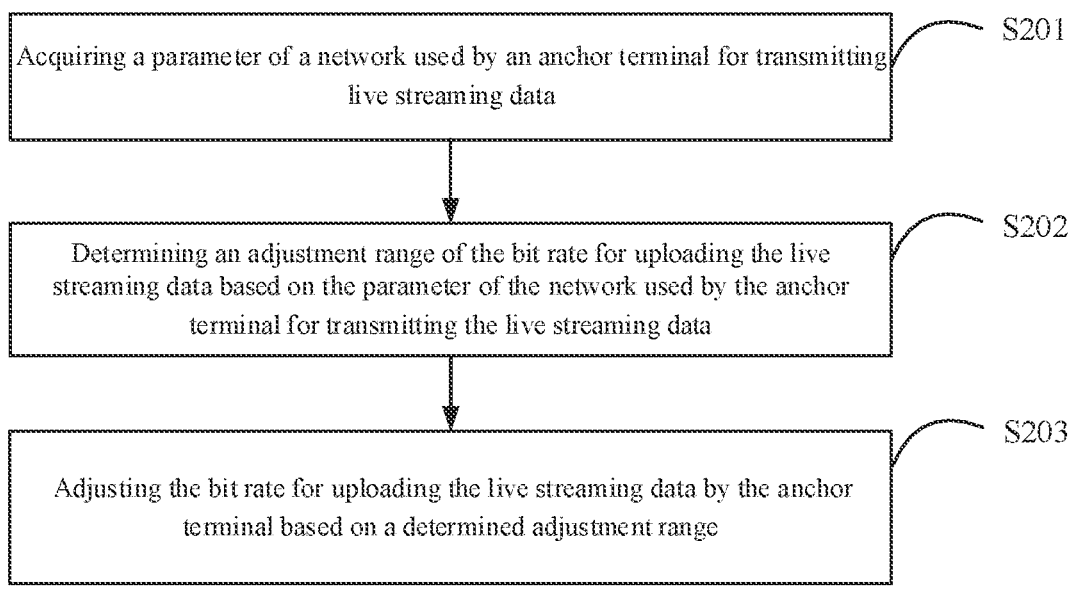
FIG. 2 illustrates a flowchart of a method for adjusting a bit rate during live streaming according to an exemplary embodiment of the present disclosure.

FIG. 2 illustrates a flowchart of a method for adjusting a bit rate during live streaming according to an exemplary embodiment of the present disclosure. The method for adjusting a bit rate during live streaming in FIG. 2 is applicable to an anchor side/terminal.

Referring to FIG. 2, in S201, a parameter of a network used by an anchor terminal for transmitting live streaming data is acquired.

In an exemplary embodiment of the present disclosure, before the parameter of the network used by the anchor terminal for transmitting the live streaming data is acquired, it may further define at least two adjustment ranges of the bit rate for uploading the live streaming data; and set a mapping relationship between the parameters of the network used by the anchor terminal for transmitting the live streaming data and the at least two adjustment ranges. Here, the parameter of the network for transmitting the live streaming data may include, but is not limited to, packet loss probability, round-trip time (RTT), bandwidth, and the like. The parameter of the network for transmitting the live streaming data may be used for evaluating the quality of the network environment (or network quality).

In an exemplary embodiment of the present disclosure, the at least two adjustment ranges include a first adjustment range and a second adjustment range, and the first adjustment range and the second adjustment range are not overlapped with each other. For example, the first adjustment range may be $[r^1_{min}, r^1_{max}]$, and the second adjustment range may be $[r^2_{min}, r^2_{max}]$, where $r^1_{max} < r^2_{min}$.

In S202, an adjustment range of the bit rate for uploading the live streaming data is determined based on the parameter of the network used by the anchor terminal for transmitting the live streaming data.

Here, there may be a plurality of adjustment ranges of the bit rate for uploading the live streaming data, that is to say, the bit rate for uploading the live streaming data may be adjusted in a plurality of ranges, that is, a plurality of grades.

In an exemplary embodiment of the present disclosure, when determining the adjustment range of the bit rate for uploading the live streaming data based on the parameter of the network used by the anchor terminal for transmitting the live streaming data, the adjustment range having the mapping relationship with the parameter of the network for transmitting the live streaming data may be selected from the at least two adjustment ranges as the adjustment range of the bit rate for uploading the live streaming data. For example, when the quality of the network used for transmitting the live streaming data is relatively poor (for example, the parameter of the network used for transmitting the live streaming data does not meet a preset condition), it is determined that the adjustment range of the bit rate for uploading the live streaming data by the anchor terminal is the first adjustment range $[r^1_{min}, r^1_{max}]$, and when the quality of the network used for transmitting the live streaming data is relatively good (for example, the parameter of the network used for transmitting the live streaming data meets the preset condition), it is determined that the adjustment range of the bit rate for uploading the live streaming data by the anchor terminal is the second adjustment range $[r^2_{min}, r^2_{max}]$.

In S203, the bit rate for uploading the live streaming data by the anchor terminal is adjusted based on a determined adjustment range.

In an exemplary embodiment of the present disclosure, when adjusting the bit rate for uploading the live streaming data by the anchor terminal based on the determined adjustment range, the bit rate for uploading the live streaming data may be adjusted within the determined adjustment range based on the parameter of the network for transmitting the live streaming data. In an exemplary embodiment of the present disclosure, when adjusting, within the determined adjustment range, the bit rate for uploading the live streaming data based on the parameter of the network for transmitting the live streaming data, when it is determined based on the parameter of the network for transmitting the live streaming data that a quality of the network for transmitting the live streaming data is improved, the bit rate for uploading the live streaming data may be increased within the determined adjustment range; and when it is determined based on the parameter of the network for transmitting the live streaming data that the quality of the network for transmitting the live streaming data is lowered, the bit rate for uploading the live streaming data may be decreased within the determined adjustment range. In some embodiments of the present disclosure, at the anchor side, a method of self-adaptively pushing live streaming data is adopted, that is, the bit rate for uploading the live streaming data by the anchor terminal is changed self-adaptively with the change of the network environment.

In an exemplary embodiment of the present disclosure, a lower limit value of the adjustment range with a highest grade in the at least two adjustment ranges is greater than a transcoding bit rate of a highest transcoding grade in a plurality of transcoding grades predefined. Here, the transcoding bit rates corresponding to the plurality of transcoding grades are bit rates used when a server transcodes the live streaming data received.

Here, an adjustment range may refer to as an adjustment range grade, and when the grade of one adjustment range is higher than another adjustment range, it means that at least one of the bit rates within said one adjustment range is greater than each of the bit rates within said another adjustment range, for example, each of the bit rates within said one adjustment range may be greater than each of the bit rates within said another adjustment range.

In some embodiments of the present disclosure, there may be a plurality of adjustment ranges of bit rate for the uploading the live steaming data, that is, there may be a plurality of adjustment range grades (bit rate ranges). Switching between a plurality of grades is performed in combination with specific network conditions for transmitting live streaming data. For example, a related switching method may be used for switching between the plurality of adjustment range grades, which is not specifically limited in the present disclosure. In the present disclosure, by taking two adjustment ranges (that is, two grades) as an example (the specific number of grades are not specifically limited in the present disclosure, and two grades are taken as an example for the convenience of description in the followings), the two adjustment ranges are defined respectively as a first adjustment range $[r^1_{min}, r^1_{max}]$ and a second adjustment range $[r^2_{min}, r^2_{max}]$, where $r^1_{max} < r^2_{min}$.

When the network used for transmitting the live streaming data is relatively good (for example, the parameter of the network used for transmitting the live streaming data meets a preset condition), the adjustment range of the bit rate for uploading the live streaming data by the anchor terminal may be determined as the second adjustment range $[r^2_{min}, r^2_{max}]$, therefore, the bit rate for uploading the live streaming data by the anchor terminal may be dynamically adjusted within the second adjustment range $[r^2_{min}, r^2_{max}]$ according to the network used for transmitting the live streaming data. In some embodiments of the present disclosure, within the second adjustment range $[r^2_{min}, r^2_{max}]$, the bit rate for uploading the live streaming data by the anchor terminal is increased as the quality of the network used for transmitting the live streaming data is improved (the network becomes better), and is decreased as the quality of the network used for transmitting the live streaming data is lowered (the network gets worse). At the server side, the live stream after being received may be transcoded into a plurality of pre-defined grades $\{r_1, r_2, r_3, \ldots, r_n\}$, which is a set of bit rates (here a predefined grade corresponds a bit rate within the set) and satisfies $r_1 < r_2 < r_3 < \ldots < r_n$. According to a current real-time network, a viewer may dynamically select the best grade to ensure the clarity and smoothness of viewing. Because such range is mainly set for the situation where the network for transmitting the live streaming data is relatively good, $r^2_{min}$ may be set relatively large, and when $r_n \leq r^2_{min}$ is satisfied, it may be set relatively large, and when $r_n \leq r^2_{min}$ is satisfied, it may still provide the viewer with good clarity.

When the network used for transmitting the live streaming data is relatively poor (for example, the parameter of the network used for transmitting the live streaming data does not meet the preset condition), the adjustment range of the bit rate for uploading the live streaming data by the anchor terminal may be determined as the first adjustment range $[r^1_{min}, r^1_{max}]$, therefore, the bit rate for uploading the live streaming data by the anchor terminal may be dynamically adjusted within the first adjustment range $[r^1_{min}, r^1_{max}]$ according to the network used for transmitting the live streaming data. In some embodiments of the present disclosure, within the first adjustment range $[r^1_{min}, r^1_{max}]$, the bit rate for uploading the live streaming data by the anchor terminal is increased as the quality of the network used for transmitting the live streaming data is improved (the network becomes better), and is decreased as the quality of the network used for transmitting the live streaming data is lowered (the network gets worse). Because such range (i.e., the first adjustment range $[r^1_{min}, r^1_{max}]$) is mainly set for the situation where the network for transmitting the live streaming data is relatively poor, $r^1_{min}$ may be set relatively small to ensure the smoothness of pushing the live streaming data. At this time, as $r^1_{min}$ is relatively small, it is not appropriate for the server to perform transcoding, and the bit rate, which is not high, can also ensure the smoothness of viewing, therefore the original bit rate may be directly assigned to the user terminal.

The method for adjusting a bit rate during live streaming according to the exemplary embodiment of the present disclosure may solve the problem that there is a contradiction between the adaptive adjustment range of the bit rate of the anchor terminal and a plurality of bit rates for pulling streaming data when the network for transmitting live streaming data fluctuates.

The method for adjusting a bit rate during live streaming according to an exemplary embodiment of the present disclosure has been described above with reference to FIGS. 1 to 2. Hereinafter, a device for adjusting a bit rate during live streaming and a unit thereof according to an exemplary embodiment of the present disclosure will be described with reference to FIG. 3.

Figure 3:
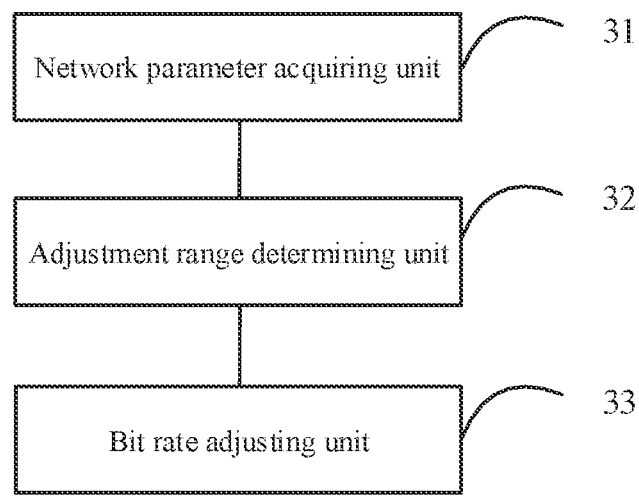
FIG. 3 illustrates a block diagram of a device for adjusting a bit rate during live streaming according to an exemplary embodiment of the present disclosure.

FIG. 3 illustrates a block diagram of a device for adjusting a bit rate during live streaming according to an exemplary embodiment of the present disclosure.

Referring to FIG. 3, the device for adjusting the bit rate during live streaming includes a network parameter acquiring unit 31, an adjustment range determining unit 32 and a bit rate adjusting unit 33.

The network parameter acquiring unit 31 is configured to acquire a parameter of a network used by an anchor terminal for transmitting live streaming data.

In an exemplary embodiment of the present disclosure, a defining and setting unit (not shown) may be further included, which is configured to: define at least two adjustment ranges of the bit rate for uploading the live streaming data; and set a mapping relationship between the parameters of the network used by the anchor terminal for transmitting the live streaming data and the at least two adjustment ranges.

In an exemplary embodiment of the present disclosure, a lower limit value of the adjustment range with a highest grade in the at least two adjustment ranges is greater than a transcoding bit rate of a highest transcoding grade in a plurality of transcoding grades predefined. Here, the transcoding bit rates corresponding to the plurality of transcoding grades are bit rates used when a server transcodes the live streaming data received.

The adjustment range determining unit 32 is configured to determine an adjustment range of the bit rate for uploading the live streaming data based on the parameter of the network used by the anchor terminal for transmitting the live streaming data.

In an exemplary embodiment of the present disclosure, the adjustment range determining unit 32 is configured to: select, from the at least two adjustment ranges, the adjustment range having the mapping relationship with the parameter of the network for transmitting the live streaming data as the adjustment range of the bit rate for uploading the live streaming data.

In an exemplary embodiment of the present disclosure, the at least two adjustment ranges include a first adjustment range and a second adjustment range, and the first adjustment range and the second adjustment range are not overlapped with each other.

The bit rate adjusting unit 33 is configured to adjust the bit rate for uploading the live streaming data by the anchor terminal based on a determined adjustment range.

In an exemplary embodiment of the present disclosure, the bit rate adjusting unit 33 may be configured to: adjust, within the determined adjustment range, the bit rate for uploading the live streaming data based on the parameter of the network for transmitting the live streaming data.

In an exemplary embodiment of the present disclosure, the bit rate adjusting unit 33 may be configured to: when it is determined based on the parameter of the network for transmitting the live streaming data that a quality of the network for transmitting the live streaming data is improved, increase, within the determined adjustment range, the bit rate for uploading the live streaming data; and when it is determined based on the parameter of the network for transmitting the live streaming data that the quality of the network for transmitting the live streaming data is lowered, decrease, within the determined adjustment range, the bit rate for uploading the live streaming data.

Regarding the device in the above-mentioned embodiment, the specific manner in which each unit performs the operation has been described in detail in the embodiment of the method, and thus will not be described in detail here.

The device for adjusting the bit rate during live streaming according to the exemplary embodiment of the present disclosure has been described above with reference to FIG. 3. Next, an electronic device according to an exemplary embodiment of the present disclosure will be described with reference to FIG. 4.

Figure 4:
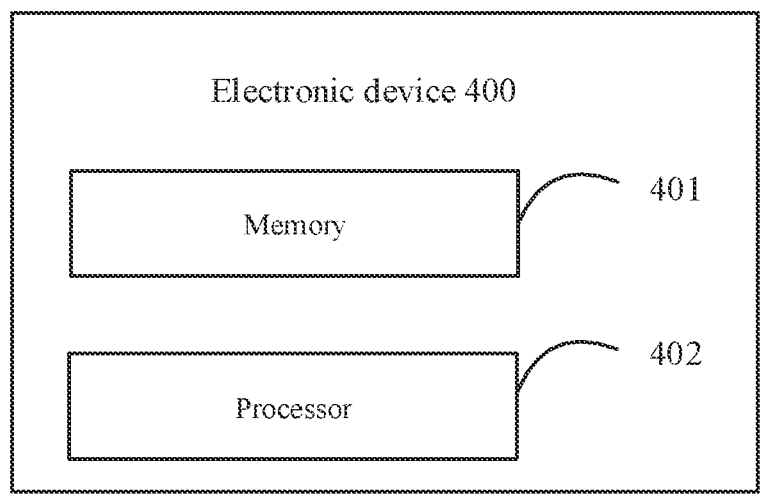
FIG. 4 is a block diagram of an electronic device 400 according to an exemplary embodiment of the present disclosure.

FIG. 4 is a block diagram of an electronic device 400 according to an exemplary embodiment of the present disclosure.

Referring to FIG. 4, the electronic device 400 includes at least one memory 401 and at least one processor 402. The at least one memory 401 stores a computer-executable instruction set that, when being executed by the at least one processor 402, implements the method for adjusting a bit rate during live streaming according to an exemplary embodiment of the present disclosure.

In an exemplary embodiment of the present disclosure, the electronic device 400 may be a PC computer, a tablet device, a personal digital assistant, a smart phone, or other devices capable of executing the above-mentioned instruction set. Here, the electronic device 400 is not necessarily a single electronic device, but can also be a collection of any devices or circuits capable of individually or jointly executing the above-mentioned instructions (or instruction set). The electronic device 400 may also be part of an integrated control system or system manager, or may be configured as a portable electronic device that interfaces locally or remotely (e.g., via wireless transmission).

In the electronic device 400, the processor 402 may include a central processing unit (CPU), graphics processing unit (GPU), programmable logic device, special purpose processor system, microcontroller, or microprocessor. By way of example and not limitation, the processor may also include analog processor, digital processor, microprocessor, multi-core processor, processor array, network processor, and the like.

The processor 402 may execute instructions or codes stored in memory 401, which may also store data. The instructions and data may also be sent and received over a network via a network interface device, which may employ any known transport protocol.

The memory 401 may be integrated with the processor 402, e.g., RAM or flash memory may be arranged within an integrated circuit microprocessor or the like. Additionally, the memory 401 may include a separate device, such as an external disk drive, a storage array, or any other storage device that may be used by a database system. The memory 401 and the processor 402 may be operatively coupled, or may communicate with each other, e.g., through I/O ports, network connections and the like, to enable the processor 402 to read files stored in the memory.

Additionally, the electronic device 400 may also include a video display (such as a liquid crystal display) and a user interaction interface (such as a keyboard, mouse, touch input device, and the like). All components of the electronic device 400 may be connected to each other via a bus and/or network.

According to an exemplary embodiment of the present disclosure, there is also provided a computer-readable storage medium including instructions, such as the memory 401 including instructions. The above instructions may be executed by the processor 402 of the device 400 to implement the above method. Alternatively, the computer-readable storage medium may be ROM, random access memory (RAM), CD-ROM, magnetic tape, floppy disk, optical data storage device, and the like.

According to an exemplary embodiment of the present disclosure, there may also be provided a computer program product including computer programs/instructions that, when being executed by a processor, implement the method for adjusting the bit rate during live streaming according to the exemplary embodiments of the present disclosure.

The method and device for adjusting the bit rate during live streaming according to the exemplary embodiments of the present disclosure have been described above with reference to FIG. 1 to FIG. 4. However, it should be understood that the device for adjusting the bit rate during live streaming and the units thereof shown in FIG. 3 may be respectively configured as software, hardware, firmware or any combination thereof to perform specific functions. The electronic device as shown in FIG. 4 is not limited to include the components shown above, some components may be added or deleted as needed, and the above components may also be combined.

The method and device for adjusting the bit rate during live streaming according to the present disclosure acquire a parameter of a network used by an anchor terminal for transmitting live streaming data; determine an adjustment range of the bit rate for uploading the live streaming data based on the parameter of the network used by the anchor terminal for transmitting the live streaming data; and adjust the bit rate for uploading the live streaming data by the anchor terminal based on a determined adjustment rang, so that the pushing of the live streaming data may be applied to the anchor terminal of different network environments (for example, which includes but not limited to an anchor terminal with a poor network quality, and an anchor terminal with an average network quality), and the viewing clarity of a user may be ensured.

A person skilled in the art may easily conceive of other embodiments of the present disclosure after consideration of the specification and practice of the invention disclosed herein. The present application is intended to cover any variations, uses, or adaptations of the present disclosure that follow the general principle of the present disclosure and include common knowledge or techniques in the technical field not disclosed by the present disclosure. The specification and examples are to be regarded as exemplary only, and the true scope and spirit of the present disclosure are indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for adjusting a bit rate during live streaming, comprising:
   acquiring a parameter of a network used by an anchor terminal for transmitting live streaming data, wherein the parameter of the network for transmitting the live streaming data is configured to evaluate a quality of the network for transmitting the live streaming data;
   determining an adjustment range of the bit rate for uploading the live streaming data based on the parameter of the network used by the anchor terminal for transmitting the live streaming data; and
   adjusting the bit rate for uploading the live streaming data by the anchor terminal based on a determined adjustment range;
   wherein a lower limit value of the adjustment range with a highest grade in at least two adjustment ranges is greater than a transcoding bit rate of a highest transcoding grade in a plurality of transcoding grades predefined,
   wherein the transcoding bit rates corresponding to the plurality of transcoding grades are bit rates used when a server transcodes the live streaming data received.

2. The method according to claim 1, further comprising, before acquiring the parameter of the network used by the anchor terminal for transmitting the live streaming data:
   defining the at least two adjustment ranges of the bit rate for uploading the live streaming data; and
   setting a mapping relationship between the parameters of the network used by the anchor terminal for transmitting the live streaming data and the at least two adjustment ranges.

3. The method according to claim 2, wherein determining the adjustment range of the bit rate for uploading the live streaming data based on the parameter of the network used by the anchor terminal for transmitting the live streaming data comprises:
   selecting, from the at least two adjustment ranges, the adjustment range having the mapping relationship with the parameter of the network for transmitting the live streaming data as the adjustment range of the bit rate for uploading the live streaming data.

4. The method according to claim 2, wherein the at least two adjustment ranges comprise a first adjustment range and a second adjustment range, and the first adjustment range and the second adjustment range are not overlapped with each other.

5. The method according to claim 1, wherein adjusting the bit rate for uploading the live streaming data by the anchor terminal based on the determined adjustment range comprises:
   adjusting, within the determined adjustment range, the bit rate for uploading the live streaming data based on the parameter of the network for transmitting the live streaming data.

6. The method according to claim 5, wherein adjusting, within the determined adjustment range, the bit rate for uploading the live streaming data based on the parameter of the network for transmitting the live streaming data comprises:
   in response to determining, based on the parameter of the network for transmitting the live streaming data, that a quality of the network for transmitting the live streaming data is improved, increasing, within the determined adjustment range, the bit rate for uploading the live streaming data; and
   in response to determining, based on the parameter of the network for transmitting the live streaming data, that the quality of the network for transmitting the live streaming data is lowered, decreasing, within the determined adjustment range, the bit rate for uploading the live streaming data.

7. An electronic device, comprising:
   a processor; and
   a memory, storing an instruction executable by the processor,
   wherein the processor is configured to execute the instruction to implement:
   acquiring a parameter of a network used by an anchor terminal for transmitting live streaming data, wherein the parameter of the network for transmitting the live streaming data is configured to evaluate a quality of the network for transmitting the live streaming data;
   determining an adjustment range of a bit rate for uploading the live streaming data based on the parameter of the network used by the anchor terminal for transmitting the live streaming data; and
   adjusting the bit rate for uploading the live streaming data by the anchor terminal based on a determined adjustment range;
   wherein a lower limit value of the adjustment range with a highest grade in at least two adjustment ranges is greater than a transcoding bit rate of a highest transcoding grade in a plurality of transcoding grades predefined,
   wherein the transcoding bit rates corresponding to the plurality of transcoding grades are bit rates used when a server transcodes the live streaming data received.

8. The electronic device according to claim 7, wherein the processor is configured to further implement, before acquiring the parameter of the network used by the anchor terminal for transmitting the live streaming data:
   defining the at least two adjustment ranges of the bit rate for uploading the live streaming data; and setting a mapping relationship between the parameters of the network used by the anchor terminal for transmitting the live streaming data and the at least two adjustment ranges.

9. The electronic device according to claim 8, wherein determining the adjustment range of the bit rate for uploading the live streaming data based on the parameter of the network used by the anchor terminal for transmitting the live streaming data comprises:
   selecting, from the at least two adjustment ranges, the adjustment range having the mapping relationship with the parameter of the network for transmitting the live streaming data as the adjustment range of the bit rate for uploading the live streaming data.

10. The electronic device according to claim 8, wherein the at least two adjustment ranges comprise a first adjustment range and a second adjustment range, and the first adjustment range and the second adjustment range are not overlapped with each other.

11. The electronic device according to claim 7, wherein adjusting the bit rate for uploading the live streaming data by the anchor terminal based on the determined adjustment range comprises:
   adjusting, within the determined adjustment range, the bit rate for uploading the live streaming data based on the parameter of the network for transmitting the live streaming data.

12. The electronic device according to claim 11, wherein adjusting, within the determined adjustment range, the bit rate for uploading the live streaming data based on the parameter of the network for transmitting the live streaming data comprises:
   in response to determining, based on the parameter of the network for transmitting the live streaming data, that a quality of the network for transmitting the live streaming data is improved, increasing, within the determined adjustment range, the bit rate for uploading the live streaming data; and
   in response to determining, based on the parameter of the network for transmitting the live streaming data, that the quality of the network for transmitting the live streaming data is lowered, decreasing, within the determined adjustment range, the bit rate for uploading the live streaming data.

13. A non-transitory computer readable storage medium having a computer program stored thereon that, when being executed by a processor of an electronic device, causes the electronic device to implement:
   acquiring a parameter of a network used by an anchor terminal for transmitting live streaming data, wherein the parameter of the network for transmitting the live streaming data is configured to evaluate a quality of the network for transmitting the live streaming data;
   determining an adjustment range of a bit rate for uploading the live streaming data based on the parameter of the network used by the anchor terminal for transmitting the live streaming data; and
   adjusting the bit rate for uploading the live streaming data by the anchor terminal based on a determined adjustment range
   wherein a lower limit value of the adjustment range with a highest grade in at least two adjustment ranges is greater than a transcoding bit rate of a highest transcoding grade in a plurality of transcoding grades predefined, wherein the transcoding bit rates corresponding to the plurality of transcoding grades are bit rates used when a server transcodes the live streaming data received.

14. The non-transitory computer readable storage medium according to claim 13, wherein the electronic device is caused to further implement, before acquiring the parameter of the network used by the anchor terminal for transmitting the live streaming data:

defining the at least two adjustment ranges of the bit rate for uploading the live streaming data; and setting a mapping relationship between the parameters of the network used by the anchor terminal for transmitting the live streaming data and the at least two adjustment ranges.

15. The non-transitory computer readable storage medium according to claim 14, wherein determining the adjustment range of the bit rate for uploading the live streaming data based on the parameter of the network used by the anchor terminal for transmitting the live streaming data comprises:

selecting, from the at least two adjustment ranges, the adjustment range having the mapping relationship with the parameter of the network for transmitting the live streaming data as the adjustment range of the bit rate for uploading the live streaming data.

16. The non-transitory computer readable storage medium according to claim 14, wherein the at least two adjustment ranges comprise a first adjustment range and a second adjustment range, and the first adjustment range and the second adjustment range are not overlapped with each other.

17. The non-transitory computer readable storage medium according to claim 13, wherein adjusting the bit rate for uploading the live streaming data by the anchor terminal based on the determined adjustment range comprises:

adjusting, within the determined adjustment range, the bit rate for uploading the live streaming data based on the parameter of the network for transmitting the live streaming data.

* * * * *